United States Patent [19]

May

[11] Patent Number: 4,820,187

[45] Date of Patent: Apr. 11, 1989

[54] TAMPER-PROOF ELECTRICAL RECEPTACLE

[76] Inventor: Donald M. May, 19842 Avenue of the Oaks, Newhall, Calif. 91321

[21] Appl. No.: 108,946

[22] Filed: Oct. 16, 1987

[51] Int. Cl.$^4$ .......................................... H01R 13/621
[52] U.S. Cl. ..................... 439/359; 439/346
[58] Field of Search ................ 439/97, 102, 133, 144, 439/147, 304, 309, 345, 346, 359, 373

[56] References Cited

U.S. PATENT DOCUMENTS

| | | | |
|---|---|---|---|
| 983,258 | 1/1911 | Buss | 439/346 |
| 4,530,556 | 7/1985 | Bonus | 439/304 X |

FOREIGN PATENT DOCUMENTS 289213 12/1914 Fed. Rep. of Germany ...... 439/359

Primary Examiner—Eugene F. Desmond
Attorney, Agent, or Firm—William T. O'Neil

[57] ABSTRACT

An electrical receptacle of the three contact type, one of which receives the standard, normally non-current-carrying, system ground pin of a corresponding cap.

A set screw is advanced into a threaded bore in the plastic body material of the receptacle to make contact with the aforementioned ground pin. The bore may be from the receptacle front or from behind the face plate, in either case preventing the casual or surreptitious removal of the cap and cord and the associated equipment.

2 Claims, 1 Drawing Sheet

U.S. Patent
Apr. 11, 1989
4,820,187
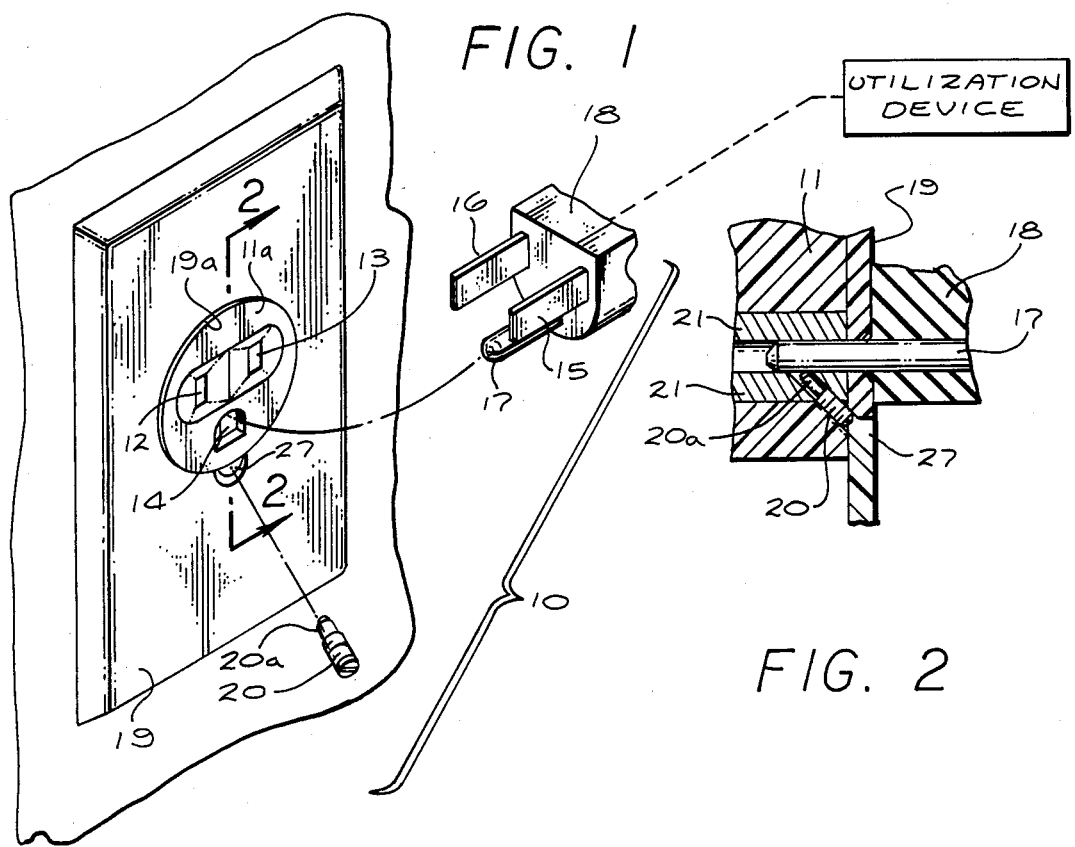
FIG. 1
FIG. 2
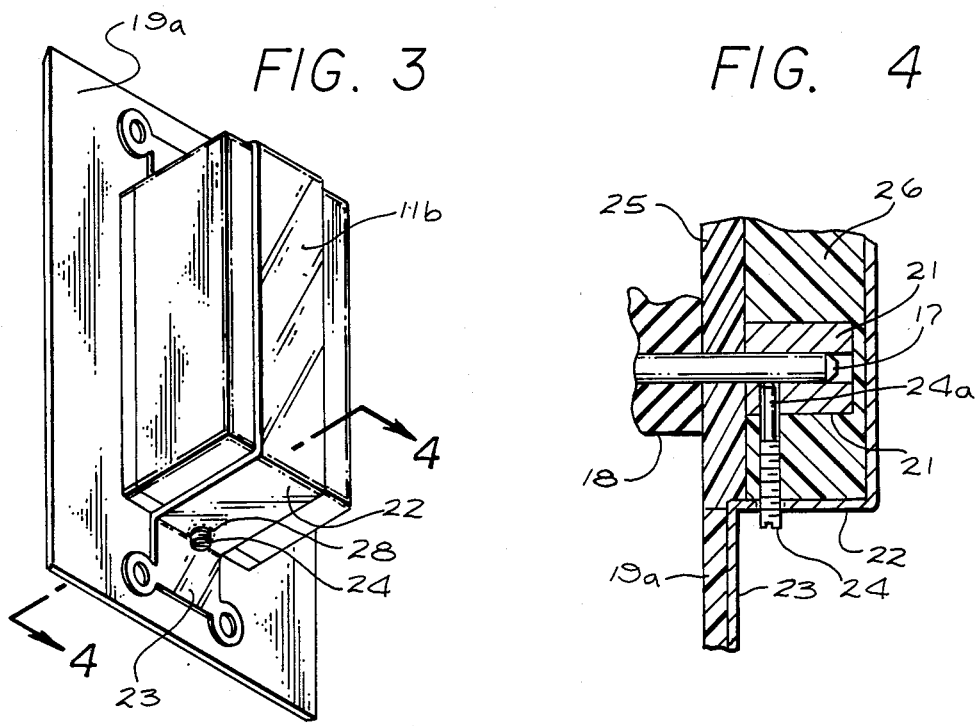
FIG. 3
FIG. 4

TAMPER-PROOF ELECTRICAL RECEPTACLE

BACKGROUND OF THE INVENTION

The invention relates generally to electrical receptacles and more specifically to associated devices for inhibiting the casual or surreptitious removal of a cord cap and associated electrical device.

In the prior art various external clamping arrangements have been employed for preventing or at least inhibiting the removal of a cord cap mated into an electrical receptacle. Such devices frequently are anchored to a screw or screws which anchor the receptacle cover plate, it is usually obvious what steps are necessary to effect quick release of the device in such arrangements. Thus a person may be able to quickly disconnect a cord and cap from the wall receptacle into which it is mated for unauthorized removal of a piece of valuable electrical apparatus, such as a personal computer, electric typewriter, television receiver, etc.

To protect against surreptitious or casual disconnection of a valuable electrical apparatus, it is highly desirable that some device be applied which is not obvious but is effective. Valuable equipment is usually not required to be frequently moved, and therefore any extra effort required to effect intentional disconnection is not significant.

The manner in which the invention addresses the aforementioned problem to produce a novel and highly advantageous solution will be evident as this specification proceeds.

SUMMARY OF THE INVENTION

In consideration of the disadvantages of prior art devices for the general purpose, it may be said that the general object of the invention was to produce means within an electrical receptacle which operates to prevent or at least inhibit the withdrawal of a cord cap from an electrical receptacle.

Modern electrical systems use the three conductor system in which the cord cap projects three prongs which are mated into the socket members of a compatibly configured receptacle. Two of these prongs and their companion socket members within the receptacle form the current carrying circuit, while a third prong acts as a safety or system ground. This third prong and its companion socket member within the receptacle from a continuous ground circuit and are normally not current carrying, except when a fault, such as a short circuit or similar event causes a current in this ground circuit. Usually a fuse or circuit breaker will then interrupt the current flow and prevent electric shock or damage. The aforementioned ground prong is thus connected to grounded means and may be touched without shock hazard. Accordingly the use of a setscrew bearing against the ground prong, as in the invention, is both convenient and safe.

Two embodiments of the invention are presented; both using a setscrew in a threaded bore within the solid insulating material body of the receptacle. In one embodiment the setscrew is installed at an acute angle with respect to the receptacle front cover plate and is front accessible. In the other embodiment the setscrew lies substantially parallel (through the receptacle body) to the cover plate and is accessible only by dismounting the receptacle itself. The details of implementation of the invention will be understood from the hereinafter description.

The invention is readily applied as a modification to electrical receptacles which in their unmodified form are standard items of commerce. The modifications are simple and inexpensive.

BRIEF DESCRIPTION OF THE DRAWINGS

FIG. 1 is a pictorial of a typical form of the invention showing a cord cap positioned for mating into a receptacle.

FIG. 2 is a partially sectioned detail of the receptacle interior with front access setscrew in place according to the invention.

FIG. 3 is a pictorial of the rear side of a receptacle of an alternative style with rear access setscrew in place.

FIG. 4 is a partially sectioned detail of the receptacle of FIG. 3 in which the setscrew is accessible from the rear only.

DETAILED DESCRIPTION

Referring now to FIG. 1 and 2 together, the common wall mounted electrical receptacle (single form) is depicted at 10 with a cord cap 18 for a utilization device shown ready for insertion into the body 11 of the receptacle. The circular perimeter 11a of the face portion of body 11 projects through a clearance hole 19a in face plate 19 in the conventional configuration, the view of face plate 19 (FIG. 1) is thus the front of the assembly.

In the known form, prongs 15 and 16 are the normally conducting circuit pair engaging socket contacts within openings 12 and 13 respectively in the body of receptacle 11, and the normally non-conducting safety (system) ground circuit is formed by contact between prong 17 and a contact within opening 14 in the receptacle body 11a. The socket members contacted by the cap prongs 15, 16 and 17 within openings 12, 13 and 14 may be referred to as constituting a 3 conductor socket format.

The front or interface surface (plane) of the receptacle 11a and cover plate 19 is as shown in FIG. 1.

In the combination according to the invention, a set screw 20 is inserted into a threaded bore in the solid insulating material of which the receptacle body 11 is formed. In the embodiment illustrated in FIGS. 1 and 2 this setscrew 20 is inserted from the front of plate 19 at an angle as shown particularly in FIG. 2, which is a sectional view taken as indicated on FIG. 1. Setscrew 20 preferably has a slightly reduced diameter end 24a so that the bore made in receptacle body 11 prior to threading can penetrate the receptacle contact 21 but the setscrew end can bear against prong 17 without disturbance to contact 21. The shape of setscrew end 20a may be said to be a refinement not actually mandatory in the combination according to the invention.

An opening 17 through face plate 19 as shown in FIGS. 1 and 2 allows for insertion of the setscrew 20 and a screwdriver or allen wrench, as appropriate, for seating and removal of the setscrew. Thus the setscrew 20 is accessible from the front of the assembly, but its presence precludes the casual or quick removal of cap 18 and therefore the surreptitious removal of the equipment to which cap 18 is attached.

Referring now to FIGS. 3 and 4, an alternative embodiment is illustrated, in which the setscrew 24 bearing against prong 17 is inserted substantially parallel to and behind face plate 19 and whatever attachements are extant securing the flange 23 of bracket 22 of receptacle 11b to the wall mounted junction box (not shown).

Although less convenient for intentional removal, the degree of security is greater than provided by the front access embodiment of FIGS. 1 and 2.

The receptacle of FIG. 3 is of the rectangular face type having a rectangular face 25 visible through a corresponding opening in face plate 19a. Like the FIG. 1 embodiment, the receptacle 11b is a single type, however, both embodiments could include a duplex receptacle although only are of the system ground prong socket members 21 would be accessible for the setscrew installation. This is obviously because of the fact that the setscrew must seat in the receptacle body adjacent to the ground prong which it is intended to lock into the corresponding receptacle.

The setscrew 24 preferably has a reduced diameter end 24a for the same purpose as contemplated for setscrew 20 with end 20a. Again, this setscrew configuration is a refinement not necessary for the practice of the invention, a conventional fully threaded setscrew being satisfactory. Setscrew 24 is to be understood to be inserted in a threaded bore in the solid insulating body 26 and passes through a clearance hole 28 in bracket 22. This is desirable so that a thread matching problem does not arise if bracket 22 also carries a threaded hole for setscrew 24 and the receptacle body 26 and bracket 22 are not firmly in contact after installation.

The sectional views of FIGS. 2 and 4 omit the showing of cap contacts 15 and 16 and their corresponding socket members in receptacle bodies 11 and 26, since those details are entirely conventional and not envolved in the specific novelty of the combination according to the invention.

While the invention is disclosed in two embodiments, it will realize that modifications falling within the spirit of the inventive concepts will suggest themselves to those of skill in this art. Accordingly, it is not intended that the scope of the invention be limited to the specifics of the drawing and this description, these being intended to be illustrative only.

What is claimed is:

1. In a system including a three-conductor electrical receptacle which includes a solid insulating body for supporting socket members corresponding to said three conductors for mating to a three-pin cord-end cap having pins in a corresponding format, a first of said pins and its corresponding socket member constituting a normally non-conducting safety ground connection, said system including a cover plate over said receptacle body, said cover plate having an aperture therethrough permitting access from mating said cord-end cap to said receptacle, the combination comprising:

a threaded bore through said receptacle body at an angle from a point of contact with said first pin within said corresponding socket member to an external point adjacent to the inside surface of said cover plate;

a set screw within said threaded bore said screw being controllable at said external point to bear against said first cord cap pin to secure said cord cap against removal;

and an opening in said cover plate aligned with said threaded bore at said external point for insertion of a tool to control said set screw.

2. Apparatus for inhibiting the removal of a three-conductor cap mated into a three-conductor receptacle, said receptacle including a first socket member for receiving a first cap prong from a normally non-current carrying safety ground, and said receptacle having a body of solid insulating material formed to hold said first socket member in position to mate with said cap prong comprising:

a threaded bore into said receptacle body at an angle from an externally accessible location to a point along the length of said first cap prong when mated into said first socket member;

a set screw inserted into said threaded bore to bear against said first cap prong in said mated position, said set screw being controllable from said externally accessible location;

a cover plate attached to said receptacle body, said cover plate having an opening exposing an interface surface of said receptacle whereby said cap seats against said interface surface when said first socket member and said first cap prong are mated;

and an opening in said cover plate aligned with said threaded bore externally accessible location for tool access to advance or withdraw said set screw.

* * * * *